July 2, 1946.   N. E. OGLESBY   2,403,018
MANUFACTURE OF ABRASIVES
Filed March 3, 1933   2 Sheets-Sheet 2

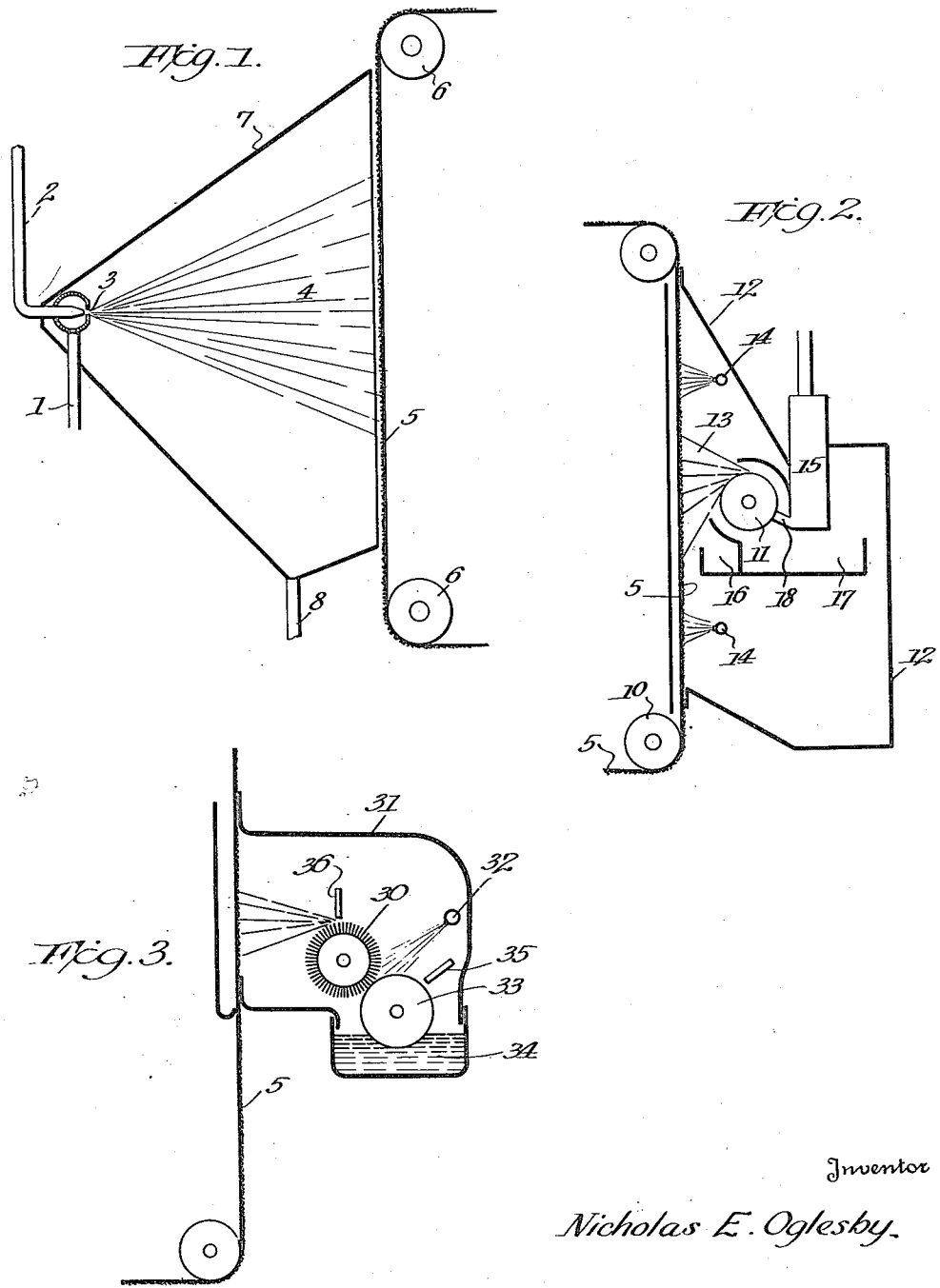

Inventor
Nicholas E. Oglesby
By Cushman, Bryant, Darby & Cushman
Attorneys

Patented July 2, 1946

2,403,018

UNITED STATES PATENT OFFICE 2,403,018

MANUFACTURE OF ABRASIVES

Nicholas Ewing Oglesby, Troy, N. Y., assignor to Behr-Manning Corporation, Troy, N. Y., a corporation of Massachusetts Application March 3, 1933, Serial No. 659,565

10 Claims. (Cl. 117—26)

This invention relates to improvements in the art of bonding solid particles, and more particularly to improvements in the art of manufacturing surface coated abrasives such as abrasive papers, abrasive cloths, abrasive discs, abrasive wheels, abrasive rolls and the like. Such abrasive articles are distinguished from grinding wheels and similar devices in that a thin surface layer of the abrasive grain is primarily effective, whereas a grinding wheel is worn away and successive layers are in turn effective. It will be appreciated by those skilled in the art that surface coated abrasives act by attrition to only a negligible extent, but on the contrary lose their effectiveness because the abrasive grains finally become dull, or because the spaces between and around the grains become loaded or filled with disintegration products of the work, or disintegration products of the work in conjunction with the adhesive used to bond the grains to each other and to the backing. In surface coated abrasives each effective grain cuts as a miniature tool and microscopic examination of the apparent dust that is removed from wood, brass, steel and the like shows that the removed particles resemble shavings or cuttings such as are removed by a plane, or lathe or other cutting tool.

From what has been said it will be apparent that it has long been a problem in the manufacture of coated abrasives to expose upstanding and sharp edges of the grain so that the edges may effectively contact and cut the work.

In the manufacture of surface coated abrasives it is accepted practice to first apply an adhesive coating (known as the making coat) to the backing, next a coating of grain which is retained, but only lightly held by the adhesive, and then after partial drying of the making coat a second coat of adhesive (known as the sizing coat) is applied. This sizing coat braces and holds the grain together and also joins with, and more securely anchors the grains to the making coat of adhesive which in turn forms the bond with the backing.

Special methods have been developed in the art to make grains stand erect in the making coat of adhesive, but, during sizing, as heretofore practiced, many of these grains are turned over so that in use their sharp edges are no longer effectively presented to the work. This turning over of many of the grains in the sizing operation has long been recognized, but has not been corrected because prior to the present invention calender rolls have been found most satisfactory for applying the sizing coat of adhesive. Much work has been done to improve calender rolls and their method of use, but, at best, many grains are turned down by the pressure of the calender rolls and a much duller product results because of this damaging action.

I am aware that in the past efforts have been made to overcome this difficulty by spraying the sizing coat of adhesive onto the abrasive retained by the making coat of adhesive. Such methods overcome the turning down of the sharp edges of the abrasive grains but lead to other equally serious or more serious defects in the product and have not therefore supplanted the calender method of sizing.

As an example of the defects of spray sizing as attempted in the past we may take the specific case of a warm solution of animal glue in water, this being the most commonly used adhesive in the coated abrasive industry. If relatively large droplets are sprayed, the droplets may have considerable momentum and some tendency to penetrate to the bottom of the abrasive coat, but these droplets do not coalesce into a smooth uniform film of adhesive well joined to the bottom coat of adhesive, and to the grains, and broken only by the discontinuities caused by the abrasive particles. With such large droplets it has heretofore been impossible to secure a smooth uniform adhesive film, free from air pockets, and effective in holding the grain without using excessive sizing adhesive which in turn fills the clearance spaces around the grains, and is conducive to loading and premature loss of effectiveness of the product. When fine droplets of the warm solution are sprayed, due to the relatively large surface area exposed, evaporation of the solvent, and cooling of the solution is relatively rapid, so that the solution in the droplets becomes very viscous or may even jell before striking the abrasive coat. With such small droplets it is easier to secure an apparently uniform coat of the sizing glue, but such sizing coats are relatively ineffective. These fine viscous droplets with case hardened surfaces do not wet or adhere well to the abrasive grains, thus forming a poor bond. Again such droplets do not completely coalesce, do not penetrate to and around the bottoms of the grain, and do not join thoroughly with the making coat of adhesive, but, on the other hand, they produce a bond with an excessive number of air pockets, tend to cover and dull the edges of the grain, form a poor film, and when used in sufficient quantity to hold the grains under conditions of use, generally produce a product inferior to that produced by calender sizing. For this reason spray sizing as heretofore practiced has not supplanted calender sizing.

I have discovered a novel method of overcoming the difficulties heretofore encountered in spray sizing, and also a novel means for improving calender sizing and coating. It is well known that lacquers and the like are applied with what is known as a spray gun in which the lacquer is atomized with compressed air. When an attempt is made to spray-size coated abrasives with an animal glue solution in this type of gun, water evaporates from the droplets, and the droplets cool and tend to develop case hardened surfaces before striking the grain so that a product is produced with the defects hereinbefore described. By using steam under pressure as the atomizing medium and/or applying the product in a semi-enclosed space substantially filled with an atmosphere of steam, I have been able to overcome the serious defects described and produce a product superior to that heretofore produced by either the calender or spray sizing method. In some instances, condensation of steam has been found to form harmful droplets of water, but this condensation may be eliminated, where objectionable, by using steam with a few degrees of superheat (so-called dry steam), and an insulated semi-enclosed space containing an atmosphere of steam for sizing application.

The steam is effective in bringing about these improvements for several reasons. The partial pressure of the steam (water) introduced opposes the vapor pressure of the fine droplets so that evaporation and concentration of the solution is reduced to any desired extent. Again the retarding of the cooling action of evaporation, and the heat introduced with the steam serve to keep the droplets fluid even at the surface where a case hardening tendency has heretofore been encountered.

Instead of spray nozzles or jets, or so-called spray guns, various other types of atomising devices well known in the art, such as high speed rolls, rotary brushes, and high speed discs, may be used to atomise and spray the glue solution, in each case, however, it has been found impossible to secure the improved product desired unless the glue is applied in an atmosphere containing a substantial proportion of steam effective to resist substantially the formation of air pockets. I prefer to use steam or other agent which is inert to the adhesive or, in other words, which does not affect the adhesive action. Moreover, I desire an agent miscible with the adhesive and which is condensible.

Dry heat or heated air does not serve the purpose, unless the heated air has added thereto water vapor, which may be most conveniently added in the form of steam. In a heated atmosphere containing a large percentage of water vapor, rapid evaporation of the water from the droplets resulting in concentration of the glues. is prevented, and the droplets are kept warm and fluid and free from case hardening, thus being in the proper condition for ready wetting and bonding of the grain, as well as coalescence, and the formation of a good film. In this warm moist atmosphere the droplets are able to flow from the tops toward the bottoms of the grain giving good holding power and free cutting grains with improved clearance around the tops of the grains. Also since this operation is carried out at or near atmospheric pressure the presence of a large percentage of water vapor reduces the percentage of permanent gases in the atmosphere surrounding the sizing operation to a very material extent. Under proper conditions the permanent gas may be almost entirely eliminated. In this way such vapor bubbles and inclusions as cannot be avoided when using the spraying method are very largely eliminated soon after their formation, and while the glue is still fluid and free to coalesce. That this is true will be readily understood when we consider that the spray sized material passes continuously through and out of the warm vapor laden atmosphere surrounding the sizing operation and into a cooler and dryer atmosphere. The temperature falls below the dew-point of the water vapor forming the bubbles and other vapor inclusions, and the vapor condenses to form a relatively small amount of warm liquid water which is readily miscible with the glue solution with the result that the original bubbles and vapor inclusions collapse under the influence of the external atmospheric pressure. In this way the steam aids very materially in eliminating air cells or pockets in the adhesive film. It will also be appreciated that the warm damp atmosphere retains the fluid condition of the glue for a short interval of time after the glue is sprayed onto the abrasive coat. This increase of fluidity, and of the time that the glue remains free to flow, allows the glue to level out and eliminate those minor defects and inequalities of glue application, from small spot to small spot, which cannot be entirely eliminated with mechanical sprays due to the difficulty of securing and maintaining mechanical perfection in such a delicate operation.

The use of warm solvent vapor to maintain a high degree of fluidity and to accomplish ready penetration and bonding of the grains makes possible another unexpected improvement in the art of bonding abrasive grains. Prior to adding the sizing coat it is common practice to allow the making coat of adhesive to set and to become reasonably well dried, but when the sizing coat is added in some cases the water (or other solvent) in the sizing adhesive so softens the bottom adhesive that some of the grains fall over instead of retaining their upright positions.

With the use of my invention it is possible to obtain more ready penetration and bonding of the abrasive grains, and this is accomplished before the solvent in the sizing adhesive has time to thoroughly penetrate and soften the making adhesive with the result that artificial cooling may be used to jell the sizing adhesive in time to prevent grains turning over due to softening of the making adhesive. This artificial cooling may be accomplished with an air blast or by passing immediately through a commercial refrigerating machine.

In the accompanying drawings, three forms of apparatus are diagrammatically shown, each of which is capable of performing the method of the present invention. The forms of apparatus disclosed are illustrative only, and it should be distinctly understood that various other forms may be used without departing from the present invention.

In the drawings:

Figure 1 is a vertical sectional view of one form of apparatus.

Figure 2 is a vertical sectional view of a second form of apparatus, employing a centrifugal roll.

Figure 3 is a vertical sectional view of another form of apparatus, employing a rotating brush.

Figure 4:
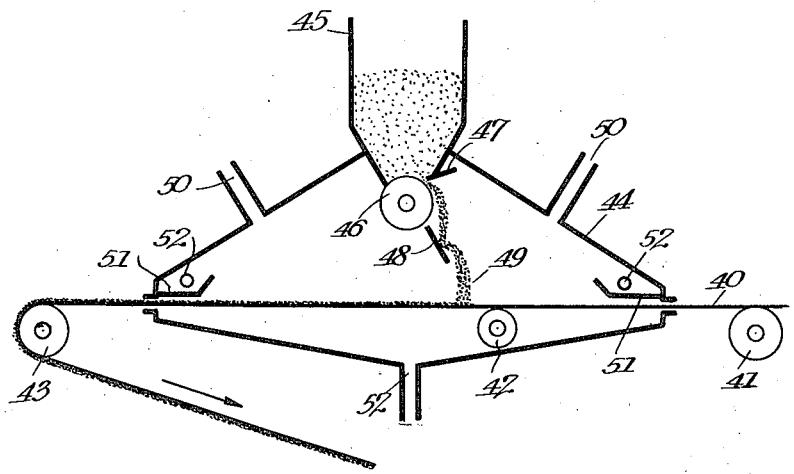
Figure 4 is a vertical sectional view of an apparatus adapted to apply abrasive particles to a coated backing member in an atmosphere of steam, or the like, which may be used in combination with the other apparatus disclosed, or which may be used independently.

In Figure 1, 1 is an inlet for super-heated vapor under pressure; 2 is an inlet for the adhesive solution; 3 is the atomizer fed by adhesive inlet 2 and atomizing vapor line 1; 4 is the spray produced by atomizer 3; 5 is an adhesively coated backing to which abrasive grains have been applied in any suitable manner and travels continuously past the spray 4 over rollers 6; 7 is a suitably insulated wall forming a closed space within which the adhesive is sprayed upon the abrasive coat; 8 is a drainage line to carry away any wild drops of adhesive and any drops formed by vapor condensation.

As a specific illustration of the method of operation we may consider the sizing with animal glue of 3/0–120 Alundum coated onto a 130# cylinder paper in the conventional way. A continuous web of the adhesively coated backing to which abrasive grains have been applied is made to travel in front of the spray 4. A solution of 18%, 114 millipoise hide glue, prepared by soaking the glue in water and melting in the usual way, and at a temperature 155° F. is fed in through adhesive inlet 2. The rate of flow of adhesive may be controlled by pressure on a closed tank, but is preferably controlled with a throttling valve in line 2 and an excess of liquid head above the valve. The steam at a pressure of 45 lbs. and with sufficient superheat to prevent serious condensation within the enclosed space around the sizing operation is allowed to flow in through 1 in an amount controlled by a valve within line 1. The amount of steam will vary with the rate at which the adhesive is sprayed, and the degrees of superheat will vary with the degree of insulation of walls 7, the tightness of the enclosure, and external temperatures. The adhesive is broken up and thrown against grains as shown in Figure 1.

One atomizer 3 has been shown for simplicity, but it will be obvious to those skilled in the art that a battery of atomizers may be used and that the atomizers may, if desired, be mounted on oscillating or traversing carriages. The exact arrangement will vary with the size of the abrasive grains, the weight of abrasive added per unit of area, the amount of adhesive that it is desired to add per unit area, the width of the coated web and the speed at which the web is passed before the spray. Operating speeds in the coated abrasive industry very commonly fall between 100 and 250 linear feet per minute, and widths of backing very commonly fall between 24 inches and 48 inches. When the sizing operation is completed, the web 5 passes to racks on which it is dried in the conventional way.

Figure 2 shows another preferred form of apparatus for carrying out my invention. 10 represents rollers over which the abrasive coated backing 5 is made to travel; 11 is a high speed roll used to spray the adhesive against abrasively coated backing 5; 12 is an insulated enclosure within which the adhesive spray 13 is applied; 14 designates inlets for the superheated steam or other vapor; 15 is a feeder for delivering adhesive to spraying roll 11, and is fed from any suitable tank or reservoir; 16 represents baffles for trapping that part of the spray which is not properly directed toward the abrasive coat; 17 is a trough to catch the drain of adhesive which is not sprayed onto the abrasive coat and this recovered adhesive is returned to the main storage reservoir by any suitable means such as a pump; 5 is the abrasively coated backing which is moved continuously past the spray 13; 18 is a slot through which the glue or other adhesive is fed from feeder 15 to spraying roll 11. The volume of adhesive solution is regulated by the static head on feeder 15 and by the distance that the tip of slot 18 is set from roll 11.

As a specific example of a sizing operation, we may consider 2/0–100 Alundum coated on a backing of 130# cylinder paper. The abrasively coated backing is led past the spray 13 at a uniform speed and is supported by rollers 10. A 22% solution of 86 millipoise hide glue prepared in the conventional way and held in a reservoir above feeder 15 is fed into feeder at a temperature of 160° F. and with a head of 36 inches, and flows through slot 18 to spray roll 11 where the greater portion is sprayed so as to strike the abrasive coating 5. Such adhesive as is not sprayed to the backing is caught by trough 17 for return to the main reservoir. Prior to, and during the time that the adhesive is being sprayed onto the abrasive coat, superheated steam at about atmospheric pressure and with about 20° F. superheat, i. e., at a temperature of about 232° F. is fed in at steam inlets 14, and gradually escapes around the cracks in the inclosure through which the coated abrasive passes. When the abrasive has passed beyond the steam chamber it is delivered to drying racks and dried in the conventional way.

In the apparatus disclosed in Figure 3, a rotating brush 30 is substituted for the centrifugal roll disclosed in Figure 2. A casing 31 similar to the casings previously described is provided, and steam is admitted to the interior thereof through the conduit 32. A roll 33 is positioned to dip into a body of adhesive 34 contained in an appropriate receptacle, and convey a film of the adhesive upwardly. A doctor blade 35 limits the thickness of this film. The rotating brush 30 is disposed in contact with the periphery of the roll 33 and, when rotated rapidly, functions to spatter or spray adhesive droplets onto the abrasive sheet 5. A doctor blade 36, associated with the roll 30 assists in discharging the spray of adhesives from the brush.

Even when calender sizing is used considerable air is trapped between the making and sizing coat of glue and also entrained in the sizing coat as air pockets. I have found that when calender sizing is carried out in an atmosphere of steam (preferably dry steam) the air inclusions can be almost entirely eliminated, and that the glue can be made to sink deeper around the bottoms of the grains, thus giving more clearance around the grains, and leaving the edges of the grains more free to cut.

Commercial abrasive grains are rough and contain depressions and similar irregularities. When the grains are allowed to fall through air, or are propelled through air to the adhesively coated backing a certain amount of air is trapped by these irregularities in the grain. It is obvious that there can be no adhesive bond where the mineral surface is separated from the adhesive surface by entrapped air. I have found that these air pockets which separate the glutinous adhesive from a part of the abrasive grain surface can be very largely eliminated by allowing the grains to strike the adhesive in an atmosphere of steam (preferably dry steam). Thus, while supplying the grains, I subject them to an agent which is condensible and which serves to resist effectively the formation of air pockets. In this way a more effective bonding of the grains to the adhesive is obtained, since when steam is trapped, it condenses shortly thereafter, creating a vacuum effect which pulls the still fluid or plastic adhesive up against the mineral surface from which the adhesive would be permanently separated by a non-condensible gas-like air.

Referring to Figure 4, an apparatus is disclosed, which is adapted to apply abrasive particles to an adhesively coated backing member, or sheet, in an atmosphere charged with the vapor of a solvent for the adhesive coating. A backing sheet 40 is provided with a coating of adhesive on its upper surface by any appropriate means, not shown, ahead of the supporting roll 41.

The coated sheet travels over rolls 41, 42, 43, into and through an enclosing casing 44. Abrasive particles are contained in a hopper 45 and are fed by roll 46 past the adjustable gate 47 to a baffle plate 48, and thence are deposited upon the adhesively coated backing sheet. A continuously and uniformly flowing shower of abrasive particles is indicated at 49.

Steam, or the vapor of any other solvent for the adhesive, is admitted to the casing through conduits 50 and serves as a suitable agent effective to resist the formation of air pockets in the manner above described. Any vapor which condenses to liquid form on the walls of the casing is caught by troughs 51 and discharged through conduits 52. Usually, the abrasive coated backing sheet travels to appropriate drying racks, not shown, after it passes over the roll 43. In some cases, however, it will be satisfactory to carry the sheet directly from the apparatus of Figure 4 to any one of the forms of apparatus disclosed in Figures 1 to 3, or to an equivalent sizing coat applying machine.

The apparatus of Figure 4, which applies abrasive grains to an adhesively coated backing sheet, in an atmosphere of a vaporized solvent, cooperates with the forms of apparatus disclosed in Figures 1 to 3, which applies an adhesive coating to the abrasives in another atmosphere charged with a vaporized solvent, because the novel step performed by each apparatus contributes to a superior final product, characterized by the entire absence of air bubbles, pockets, or the like.

In the examples heretofore cited reference has been almost entirely to glues as typical of adhesives that are soluble in, and are used in water solution. These examples have been treated very fully since glue is the adhesive most commonly used in the coated abrasive industry. My invention is not, however, limited to use with glues or to adhesives that are soluble in water. Solutions of varnishes, of natural resins and of synthetic resins in volatile organic solvents also find application in the coated abrasive industry. As examples of common solvents used with varnishes we may cite Varnolene, oleum spirits and high-flash naphtha. With certain synthetic and natural resins these same solvents may be used but such volatile organic solvents as alcohol and acetone are also used.

As specific examples I may cite solutions of ester gum varnishes in oleum spirits, solutions of DuLux (du Pont) resins (often called varnishes) in high-flash naphtha, solutions of shellac in alcohol, and solutions of phenolformaldehyde resins in alcohol or acetone. The varnishes and synthetic resins usually are most advantageously set or cured by using heat after application of the sand and the adhesive coats. Solutions of adhesives of the varnish and resin type as a rule tend to set to a very viscous or to a jelly like mass less readily than animal glues and do not as a class give so much trouble due to case hardening and increase in viscosity of the droplets during the spray sizing operation. Such adhesives do, however, trap air and give rise to air pockets and bubbles in the final film, especially when the spray sizing system is used. My invention very materially reduces these air inclusions in adhesives of these types and also causes inequalities in the sprayed adhesive to flow out and give a more uniform and perfectly bonding adhesive coat with proper clearance between the grains.

When volatile organic solvents are used instead of water to dissolve the adhesive in question I introduce around the sizing operation warm or hot vapor of the particular organic solvent in question instead of steam. The vapor temperature should preferably be held above the dew point so as to prevent condensation of droplets on the goods in process or on the equipment so that they subsequently drain onto the goods. The vapor introduced slows down the rate of evaporation of the solvent from the droplets, prevents surface concentration in the droplets, and, to the extent present, replaces the permanent gas (air). With sufficient vapor present the same will serve as an agent effective to resist the formation of air pockets. The permanent gases (air) can be almost entirely eliminated so that any bubbles or gas inclusions formed in the adhesive film consist of condensible vapor, which vapor shortly thereafter readily condenses to form minute particles of liquid readily miscible with the adhesive solution. The vapor pockets or bubbles thereupon become small vacua which readily collapse to give a union between adhesive to adhesive or adhesive to grain.

Thus in the practice of my invention I use an agent which is a solvent for the adhesive and inert thereto in the sense that it does not affect the adhesive action. For example an atmosphere comprising a substantial proportion of water vapor is used where water is the solvent, of alcohol vapor where alcohol is the solvent, of high flash naphtha vapor where high flash naphtha is the solvent. In general, I use vapor of the same volatile solvent that is used to dissolve the adhesive, whereby the droplets are kept fluid and free from case hardening in their passage to the abrasive coat, and whereby pockets, bubbles, and other permanent gas inclusions in the adhesive coating are largely eliminated. When I state that I use an "atmosphere" or "atmosphere of an agent," I mean that the surrounding or influencing conditions are of such character as to accomplish the result desired, and do not intend to restrict myself to any precise atmospheric condition since the proportion of the charge of any agent in the atmosphere will depend upon particular conditions and the precise results desired.

Certain specific adhesives are per se of light body and require little or no solvent to increase their fluidity to the proper spraying and sizing consistency. In this class we may mention solutions of early stage (A stage) phenol formaldehyde resins in alcohol or acetone solutions. When these resins are sprayed warm very little solvent is required in some cases to reduce the viscosity to the proper spraying or sizing consistency. However, in such cases the use of my invention of carrying out the sizing operation in an atmosphere charged with warm alcohol vapor, or warm acetone vapor will eliminate air pockets, and other air inclusions so as to produce superior bonding and free cutting abrasive grains.

As is well known mixed solvents are sometimes used to dissolve adhesives. As examples we may cite solutions of nitrocellulose in a mixture of alcohol and ether, or in a mixture of amyl acetate and butyl alcohol; solutions of common varnishes in a mixture of turpentine and oleum spirits, or of other varnishes in a mixture of oleum spirits and high-flash naphtha. In such cases it will sometimes be advantageous to carry out the sizing operation in an atmosphere charged with a mixture of the solvent vapors.

This invention has been illustrated with particular reference to its use in making single abrasive coats. It is obvious that the invention may be used to build up any thickness of abrasive coat desired by a repetition of the process. Thus, after the initial coating of abrasive is made, the sizing operation may be carried out as disclosed, a second coat of abrasive may be applied, then a second sizing operation may be carried out, and the cycle may be repeated until the thickness required is obtained.

I claim:

1. In the manufacture of abrasive articles, the step in the process which consists of adding abrasive grains to an adhesively coated backing sheet in an atmosphere charged with the vapor of a solvent for the adhesive.

2. In the manufacture of abrasive articles, the step in the process which consists of adding abrasive grains to a backing sheet coated with a water soluble adhesive in an atmosphere charged with steam.

3. In the manufacture of abrasive articles, the improved method which consists in depositing in oriented positions abrasive particles on a carrier having an adhesive coat, applying a sizing adhesive to the abrasive particles on the carrier in an atmosphere charged with a solvent for the adhesive in an amount sufficient to insure thorough penetration of the adhesive between the abrasive particles and the joining thereof with the previously applied adhesive coat, and artificially cooling the adhesive to quickly gel the same.

4. In the manufacture of coated abrasives having abrasive grains anchored to a flexible backing by a making coat of adhesive in which the said grains are embedded and having a sizing coat of adhesive applied over the said grains and joining with the making coat to form a composite abrasive binder, the improved method of substantially eliminating air inclusions between the union of the irregular abrasive grain surfaces and the composite abrasive binder comprising applying the abrasive grains to the making coat of adhesive in an atmosphere of condensible solvent for the making coat of adhesive and thereafter applying the sizing coat of adhesive over the abrasive grains in an atmosphere of solvent for the sizing adhesive, the said atmospheres having condensible adhesive vapor replacing air in an amount sufficient to substantially eliminate air inclusions between the adhesives and the abrasive grains.

5. In the manufacture of coated abrasives having abrasive grains anchored to a flexible backing by a making coat of adhesive in which the said grains are embedded and having a sizing coat of adhesive applied over the said grains and joining with the making coat to form a composite abrasive binder, the improved method of applying the sizing adhesive comprising passing an abrasively coated web having abrasive grains anchored thereto by a making coat of adhesive through a confining space, introducing into said confining space superheated vapor of a condensible solvent for the sizing adhesive in an amount sufficient to remove the greater part of the air in said confining space, and applying a sizing coat of adhesive over the abrasive grains in the confining space whereby air inclusions between the making and sizing adhesives and between the sizing adhesive and the abrasive grains are substantially eliminated and subsequently setting the sizing adhesive.

6. In the manufacture of coated abrasives having abrasive grains anchored to a flexible backing by a making coat of adhesive in which the said grains are embedded and having a sizing coat of adhesive applied over the said grains and joining with the making coat to form a composite abrasive binder, the improved method of applying the sizing coat of adhesive comprising passing an abrasively coated web having the abrasive grains anchored thereto by a making coat of adhesive through a confining space, providing in the confining space an atmosphere of condensible solvent for the sizing coat of adhesive, the said atmosphere having condensible adhesive vapor replacing air in an amount sufficient to substantially eliminate air inclusions between the said sizing adhesive and the said abrasive grains, calender rolling a coating of a sizing adhesive, within the said confining space, onto the abrasively coated side of said web and subsequently setting the sizing adhesive.

7. In the manufacture of abrasive articles of the character including a carrier, surface abrasive particles thereon and an adhesive bond for said particles, the improved method of increasing the strength of the bond and the area of contact between the particles and the adhesive which comprises calender rolling sizing adhesive onto the abrasive particles on the carrier while subjecting the said adhesive and the said abrasive particles on the carrier to a vapor solvent for the said adhesive effective to materially reduce air inclusions caused by the formation of air pockets by condensation of the vapor into a liquid miscible with said sizing adhesive.

8. In the manufacture of abrasive articles the process comprising applying a coating of adhesive to a flexible backing, passing the backing so coated through a confining zone, introducing into the confining zone the superheated vapor of a solvent for the said adhesive and adding abrasive grains to the said adhesive on the backing in the atmosphere so created in the confining zone.

9. In the manufacture of abrasive articles the process comprising applying a coating of water soluble adhesive to a flexible backing, passing the backing so coated through a confining zone, introducing into the confining zone superheated steam and adding abrasive grains to the said adhesive on the backing in the atmosphere so created in the confining zone.

10. In the manufacture of abrasive articles the process comprising applying a coating of water soluble adhesive to a flexible backing, passing the backing so coated through a confining zone, introducing into the confining zone superheated steam in an amount sufficient to replace the greater part of the air in the said confining zone and adding abrasive grains to the said adhesive on the backing in the atmosphere so created in the confining zone.

NICHOLAS EWING OGLESBY.